US010597585B2

(12) United States Patent
Bezemer et al.

(10) Patent No.: US 10,597,585 B2
(45) Date of Patent: Mar. 24, 2020

(54) METHOD OF PRODUCING HYDROCARBONS

(71) Applicant: SHELL OIL COMPANY, Houston, TX (US)

(72) Inventors: Gerrit Leendert Bezemer, Amsterdam (NL); Hans Michiel Huisman, Amsterdam (NL); Tyrone James McKnight, Amsterdam (NL); Wilhelmus Johannes Franciscus Scholten, Amsterdam (NL); Wenping Yang, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/346,814

(22) PCT Filed: Nov. 2, 2017

(86) PCT No.: PCT/EP2017/078046
§ 371 (c)(1),
(2) Date: May 1, 2019

(87) PCT Pub. No.: WO2018/083172
PCT Pub. Date: May 11, 2018

(65) Prior Publication Data
US 2019/0276747 A1 Sep. 12, 2019

(30) Foreign Application Priority Data

Nov. 7, 2016 (EP) ..................................... 16197562

(51) Int. Cl.
| | | |
|---|---|---|
| *C10G 2/00* | (2006.01) | |
| *C01B 3/36* | (2006.01) | |
| *C01B 3/38* | (2006.01) | |
| *C10G 11/00* | (2006.01) | |
| *C10J 3/72* | (2006.01) | |
| *C10G 47/00* | (2006.01) | |

(52) U.S. Cl.
CPC ................ *C10G 2/331* (2013.01); *C01B 3/36* (2013.01); *C01B 3/38* (2013.01); *C10G 11/00* (2013.01); *C10G 47/00* (2013.01); *C10J 3/72* (2013.01); *C01B 2203/0233* (2013.01); *C01B 2203/0244* (2013.01); *C01B 2203/0255* (2013.01); *C01B 2203/049* (2013.01); *C01B 2203/0465* (2013.01); *C01B 2203/0485* (2013.01); *C01B 2203/062* (2013.01); *C10G 2300/1011* (2013.01); *C10G 2300/1022* (2013.01); *C10G 2300/1025* (2013.01); *C10G 2300/4018* (2013.01); *C10J 2300/1659* (2013.01); *Y02P 30/20* (2015.11)

(58) Field of Classification Search
CPC . C10G 2/32; C10G 7/00; C10G 73/42; C10G 2/332; C10G 2/30
See application file for complete search history.

(56) References Cited

U.S. PATENT DOCUMENTS

| | | |
|---|---|---|
| 4,409,131 A | 10/1983 | Fetchin |
| 4,595,703 A | 6/1986 | Payne et al. |
| 5,502,019 A | 3/1996 | Augustine et al. |
| 5,783,604 A | 7/1998 | Garcia Nunez |
| 5,783,607 A | 7/1998 | Chaumette et al. |
| 5,863,856 A | 1/1999 | Mauldin |
| 6,855,248 B1 * | 2/2005 | Olivier ..................... C10G 7/00 203/DIG. 25 |
| 2004/0256288 A1 | 12/2004 | Font Freide |

FOREIGN PATENT DOCUMENTS

| | | |
|---|---|---|
| CA | 1166655 A | 5/1984 |
| EP | 2687577 A1 | 1/2014 |
| WO | 9603345 A1 | 2/1996 |
| WO | 9700231 A1 | 1/1997 |
| WO | 0011113 A1 | 3/2000 |
| WO | 0176734 A1 | 10/2001 |
| WO | 2007009951 A1 | 1/2007 |

OTHER PUBLICATIONS

International Search Report and Written Opinion received for PCT Patent Application No. PCT/EP2017/078046, dated Jan. 31, 2018, 10 pages.

* cited by examiner

*Primary Examiner* — Jafar F Parsa

(57) ABSTRACT

A method of producing normally solid, normally liquid and optionally normally gaseous hydrocarbons involves contacting a gas mixture comprising hydrogen and carbon monoxide with a catalyst under elevated temperature and pressure, to convert at least part of the hydrogen and carbon monoxide into hydrocarbons. An effluent is withdrawn from the reactor and subjected to a separation step to form at least a heavy fraction and a light fraction. The heavy fraction comprises normally solid hydrocarbons, while the light fraction comprises unconverted syngas and normally liquid and optionally normally gaseous hydrocarbons.
The light fraction is sent to a light ends stripper operating at a temperature of maximally 200° C. to obtain a hydrocarbons fraction comprising normally liquid hydrocarbons. The heavy fraction is subjected to flash evaporation or steam stripping to obtain a hydrocarbon stream of normally solid hydrocarbons (comprising mainly C10+ hydrocarbons).

12 Claims, No Drawings

METHOD OF PRODUCING HYDROCARBONS

CROSS REFERENCE TO RELATED APPLICATION

This is a US national stage application of International Application No. PCT/EP2017/078046, filed 2 Nov. 2017, which claims benefit of priority of European application No. 16197562.8, filed 7 Nov. 2016.

FIELD OF THE INVENTION

The present invention relates to a method of producing normally solid, normally liquid and optionally normally gaseous hydrocarbons.

BACKGROUND TO THE INVENTION

The Fischer-Tropsch process can be used for the conversion of synthesis gas into liquid and/or solid hydrocarbons. The synthesis gas may be obtained from hydrocarbonaceous feedstock in a process wherein the feedstock, e.g. natural gas, associated gas and/or coal-bed methane, heavy and/or residual oil fractions, coal, biomass, refuse is converted in a first step into a mixture of hydrogen and carbon monoxide. This mixture is often referred to as synthesis gas or syngas. The synthesis gas is then fed into a reactor where it is converted in one or more steps over a suitable catalyst at elevated temperature and pressure into paraffinic compounds and water in the actual Fischer-Tropsch process. The obtained paraffinic compounds range from methane to high molecular weight modules. The obtained high molecular weight modules can comprise up to 200 carbon atoms, or, under particular circumstances, even more carbon atoms. Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebullated bed reactors.

Catalysts used in the Fischer-Tropsch synthesis often comprise a carrier-based support material and one or more metals from Group 8-10 of the Periodic Table of Elements, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

Plants utilizing the Fischer-Tropsch process to convert syngas into long chain hydrocarbons are complex and comprise a large quantity of hardware. As the synthesis products consists of a variety of hydrocarbons having different carbon chain lengths starting methane to molecules having a chain length of more than 30 carbon atoms. Next to hydrocarbons water is a product of the Fischer-Tropsch synthesis. All these components exit the Fischer-Tropsch reactor in the effluent together with unconverted carbon monoxide and hydrogen and carbon dioxide. Typically, in order to remove the lighter Fischer-Tropsch hydrocarbons, H2O, CO and CO2 from the effluent one or more LES (light ends stripper) column is used. In order to remove these components the LES is operated at high temperatures requiring a lot of energy. Moreover the LES is a large column which are costly and complex to operate. This energy requirement and high costs weigh even heavier in case smaller plants are built. Further large and complex equipment takes up a lot of plot space and adds to the equipment count which is also disadvantageous.

SUMMARY OF THE INVENTION

It is at least an object of the present invention to provide a solution to at least some of the drawbacks of the prior art.

One or more of the objects is met by the method of the present invention. The present invention provides for a method of producing normally solid, normally liquid and optionally normally gaseous hydrocarbons. Said method comprises the steps of:
a) Contacting in a reactor a gas mixture comprising hydrogen and carbon monoxide with a catalyst under elevated temperature and pressure, to convert at least part of the hydrogen and carbon monoxide into hydrocarbons;
b) Withdrawing an effluent from the reactor through one or more outlets;
c) subjecting the effluent(s) obtained in step (b) to a separation step to form at least a heavy fraction and a light fraction wherein:
the heavy fraction comprises normally solid hydrocarbons; and
the light fraction comprises unconverted syngas and normally liquid and optionally normally gaseous hydrocarbons.

The method further comprises the steps of:
d) providing the light fraction to a light ends stripper operating at a temperature of maximally 200° C. to obtain a hydrocarbons fraction comprising normally liquid hydrocarbons;
e) subjecting the heavy fraction to flash evaporation or steam stripping to obtain a hydrocarbon stream of normally solid hydrocarbons (comprising mainly C10+ hydrocarbons).

DETAILED DESCRIPTION OF THE INVENTION

The present invention provides for a method of producing normally solid, normally liquid and optionally normally gaseous hydrocarbons. With normally gaseous, liquid and/or solid hydrocarbons is meant the state these hydrocarbons are in at 0° C. and 1 bar.

The method according to the invention comprises a step a). This step includes contacting, in a reactor a gas mixture comprising hydrogen and carbon monoxide with a catalyst under elevated temperature and pressure, to convert at least part of the hydrogen and carbon monoxide into hydrocarbons.

The conversion of carbon monoxide and hydrogen into hydrocarbons in the process according to the present invention may be carried out at any reaction pressure and gas hourly space velocity known to be suitable for Fischer-Tropsch hydrocarbon synthesis. Preferably, the reaction pressure is in the range of from 10 to 100 bar (absolute), more preferably of from 20 to 80 bar (absolute). The gas hourly space velocity is preferably in the range of from 500 to 25,000 h−1, more preferably of from 900 to 15,000 h−1, even more preferably of from 1,300 to 8,000 h−1. Preferably, the reaction pressure and the gas hourly space velocity are kept constant. Preferably the catalyst used is based on iron or cobalt, cobalt is preferred.

The synthesis process of step a) may be a slurry Fischer-Tropsch process, an ebullated bed process or a fixed bed Fischer-Tropsch process. A multitubular fixed bed process is preferred. The gas mixture may be contacted with a catalyst comprising a support material, selected from the group consisting of refractory oxides preferably being titania, alumina, or zirconia and catalytically active metal selected from the group consisting of cobalt, iron and/or ruthenium and optionally a promotor.

Fischer-Tropsch catalysts are known in the art, and typically include a Group VIII metal component, preferably cobalt, iron and/or ruthenium, more preferably cobalt and/or iron, most preferably cobalt.

The catalytically active material comprises particles comprising the catalyst, a support/carrier material and optionally one or more promoters. The support/carrier material is preferably chosen from the group of porous inorganic refractory oxides, preferably alumina, silica, titania, zirconia or mixtures thereof.

The catalytically active material may be present together with one or more metal promoters or Co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIIB and/or VIII of the Periodic Table. Preferred metal promoters include rhenium, platinum, ruthenium and palladium. A most suitable catalyst material comprises cobalt and zirconium as a promoter. Another most suitable catalyst comprises cobalt and manganese and/or vanadium as a promoter.

General methods of preparing catalytically active materials and precursors thereof are known in the art, see for example U.S. Pat. Nos. 4,409,131, 5,783,607, 5,502,019, WO 0176734, CA 1166655, U.S. Pat. Nos. 5,863,856 and 5,783,604. These include preparation by co-precipitation and impregnation.

The method of the invention further comprises a step b) wherein an effluent is withdrawn from the reactor through one or more outlets. For the present invention with effluent is meant the synthesized hydrocarbons.

After withdrawal of the effluent the effluent is subjected to a separation step c). In this separation step the light fraction is separated from the heavy fraction. This separation may also be at least in part accomplished in the Fischer-Tropsch reactor. If this is the case then an effluent leaving the reactor is the heavy fraction and a second effluent consists largely of the light fraction. The light fraction may be subjected to cooling in order for residual heavy hydrocarbons to be separated from the light fraction. The heavy fraction comprises normally solid hydrocarbons and the light fraction unconverted syngas and normally liquid and optionally normally gaseous hydrocarbons.

In methods according to the prior art, the heavy and light fractions are provided to a LES together. This requires for the LES to be operated at high temperatures of least 250° C. In these methods the effluent withdrawn from the LES consists of the light and heavy fraction.

In the method of the present invention the light and heave fractions are treated separately. In step d) of the method of the invention the light fraction is provided to a light ends stripper operating at a temperature of maximally 200° C. to obtain a hydrocarbons fraction comprising normally liquid hydrocarbons. As the light fraction only contains normally liquid hydrocarbons or lighter the LES does not have to be operated at high temperatures and a 5-10 times smaller version of the LES may be used. This reduces the costs of the LES and makes maintenances easier which reduces down time of the installation.

The heavy fraction is subjected to flash evaporation or steam stripping to remove some volatile impurities, to obtain a hydrocarbon stream of normally solid hydrocarbons. These are low cost and basic techniques. The off gas obtained with flash evaporation may be provided to the LES together with the light fraction.

The inventors have surprisingly found that by keeping the heavy and light fraction separated during further treatment a line-up may be used that is cheaper, less complex and less energy intensive compared to prior art line-ups. It further allows for a reduction in equipment and is therefore economically favorable.

In an aspect of the invention the light ends stripper is operated at a temperature of maximally 180° C., preferably in the range of 100 to 180° C. As the LES may be operated at such low temperatures the energy consumption is a lot less than that of prior art methods.

In an aspect of the invention the light ends stripper is heated indirectly with steam. As high temperatures are no longer required, the requirements for the heating of the LES are different. The LES can be heated indirectly with steam which is easier and cheaper to maintain. At higher temperatures hot oil is required as a heat transfer medium which adds to the complexity of the LES making it expensive to obtain and maintain.

In an aspect of the invention the method comprises a step f) wherein the hydrocarbon fractions obtained in step d) and e) are combined. Depending on the product to be obtained from the Fischer-Tropsch wax it may be advantageous to combine both fractions. This is advantageous in case both fractions are intended to be subjected to the same treatment.

In an aspect of the invention the method comprises a step g) wherein the hydrocarbon fractions obtained in step d) and/or e) or the combination of fractions obtained in step f) are subjected to catalytic cracking.

In an aspect of the invention step a) is preceded by a step in which a carbonaceous feed stock is subjected to gasification or reforming such as steam reforming, auto-thermal reforming or partial oxidation to obtain a gas mixture comprising hydrogen and carbon monoxide. The obtained synthesis gas may be subjected to further treatment in order to remove S containing compounds, HCN and soot from the synthesis gas.

In an aspect of the invention the effluent(s) is (are) withdrawn from the reactor in an amount of at least 600 kg per hour. As the present invention provides for a substantial cost reduction, the method is suitable for use in small scale plants. These plants are based on for example microchannel Fischer-Tropsch reactors which can be used for smaller plants than for example the fixed bed Fischer-Tropsch or slurry bed reactors.

In an aspect of the invention the carbon monoxide and hydrogen are obtained from a carbonaceous feedstock selected from coal, biomass, refuse and natural gas. Said feedstock is preferably subjected to partial oxidation in order to obtain carbon monoxide and hydrogen.

Partial oxidation of natural gas using pure oxygen may be operated at 1100 to 1700° C. Preferably partial oxidation of natural gas using pure oxygen is operated at 1300 to 1500° C. and pressures up to 70 bar. Another example of a process for partially oxidating natural gas is described in WO9603345A1 where a mixture of carbon monoxide and hydrogen is prepared by partial oxidation of natural gas in a co-annular burner using 99.5% pure oxygen and optionally carbon dioxide as moderator gas and in the absence of a catalyst. In case the syngas is obtained from natural gas it is preferred that the Fischer-Tropsch catalyst is based on cobalt.

In case of coal the method may be carried out by partially combusting coal with a limited volume of oxygen at a temperature normally between 800° C. and 2000° C. in the absence of a catalyst. If a temperature of between 1050 and 2000° C. is employed, the product gas will contain very small amounts of gaseous side products such as condensable tars, phenols and hydrocarbons. Suitable coals include lignite, bituminous coal, sub-bituminous coal, anthracite coal, and brown coal. Lignites and bituminous coals are preferred. In order to achieve a more rapid and complete gasification, initial of the coal is preferred. Particle size is preferably selected so that 70% of the solid coal feed can pass a 200 mesh sieve. The gasification is preferably carried out in the presence of oxygen and steam, the purity of the oxygen preferably being at least 90% by volume, nitrogen, carbon dioxide and argon being permissible as impurities. Substantially pure oxygen is preferred, such as prepared by an air separation unit (ASU). For coal-derived syngas the H2/CO ratio of the gas mixture obtained in step (a) generally about or less than 1, and is commonly about 0.3-0.6. Such a ratio is suited for an iron catalyzed Fischer-Tropsch reaction.

One or more of the above described aspects and/or embodiments may be combined. The claims form an integral part of the present description by way of this reference.

While the invention has been described in terms of what are presently considered to be the most practical and preferred embodiments, it is to be understood that the disclosure need not be limited to the disclosed embodiments. It is intended to cover various modifications, combinations and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

That which is claimed is:

1. A method of producing normally, meaning at 0 ° C. and at 1 bar, solid, normally liquid and optionally normally gaseous hydrocarbons comprising the steps of:
   a) contacting in a reactor a gas mixture comprising hydrogen and carbon monoxide with a catalyst under elevated temperature and pressure, to convert at least part of the hydrogen and carbon monoxide into hydrocarbons;
   b) withdrawing an effluent from the reactor through one or more outlets;
   c) subjecting the effluent(s) obtained in step (b) to a separation step to form at least a heavy fraction and a light fraction wherein
   the heavy fraction comprising normally solid hydrocarbons; and
   the light fraction comprising unconverted syngas and normally liquid and optionally normally gaseous hydrocarbons;
   the method further comprising the steps of:
   d) providing the light fraction to a light ends stripper operating at a temperature of maximally 200° C. to obtain a hydrocarbons fraction comprising normally liquid hydrocarbons;
   e) subjecting the heavy fraction to flash evaporation or steam stripping to obtain a hydrocarbon stream of normally solid hydrocarbons (comprising mainly C10+ hydrocarbons).

2. The method according to claim 1, wherein the light ends stripper is heated indirectly with steam.

3. The method according to claim 1, wherein the light ends stripper is operated at a temperature of maximally 180° C.

4. The method according to claim 1, comprising a step f) wherein the hydrocarbon fractions obtained in step d) and e) are combined.

5. The method according to claim 1, comprising a step g) wherein the hydrocarbon fractions obtained in step d) and/or e) or the combination of fractions obtained in step f) are subjected to catalytic cracking.

6. The method according to claim 1, wherein step a) is preceded by a step in which a carbonaceous feed stock is subjected to gasification or reforming such as steam reforming, autothermal reforming or partial oxidation to obtain a gas mixture comprising hydrogen and carbon monoxide.

7. The method according to claim 1, wherein step a) is conducted at a pressure in the range from 20 to 80 bar absolute, a temperature in the range from 125 to 350° C. and a gaseous hourly space velocity in the range from 500 to 10000 Nl/l/h.

8. The method according to claim 1, wherein the gas mixture is contacted with a catalyst comprising a support material, selected from the group consisting of refractory oxides and catalytically active metal selected from the group consisting of cobalt, iron, ruthenium and combinations thereof.

9. The method according to claim 1, wherein the effluent(s) is (are) withdrawn from the reactor in an amount of at least 600 kg per hour.

10. The method according to claim 1, wherein the light ends stripper is operated at a temperature in a range of 100 to 180° C.

11. The method according to claim 1, wherein the refractory oxide is selected from the group consisting of titania, alumina, zirconia and combinations thereof.

12. The method of claim 1, wherein the catalyst further comprises a promotor.

* * * * *